J. J. STRONG.
COUNTERBALANCING DEVICE.
APPLICATION FILED JULY 29, 1914.
1,155,846.
Patented Oct. 5, 1915.
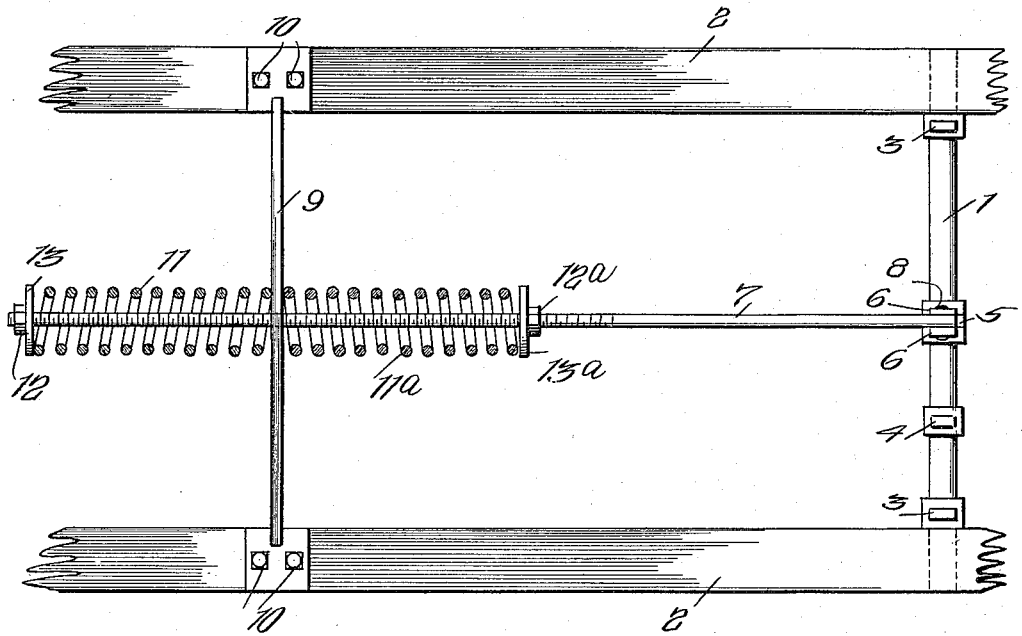
WITNESSES
INVENTOR
JOHN J. STRONG,
BY
ATTORNEYS.

UNITED STATES PATENT OFFICE.

JOHN J. STRONG, OF BIRMINGHAM, ALABAMA.

COUNTERBALANCING DEVICE.

1,155,846. Specification of Letters Patent. Patented Oct. 5, 1915.

Application filed July 29, 1914. Serial No. 853,862.

*To all whom it may concern:*

Be it known that I, JOHN J. STRONG, a citizen of the United States, and a resident of Birmingham, in the county of Jefferson and State of Alabama, have invented a new and useful Improvement in Counterbalancing Devices, of which the following is a specification.

My invention is an improvement in counterbalances for locomotive gear, and has for its object to provide mechanism for use in connection with the reverse mechanism of a locomotive for counterbalancing the said reversing mechanism to make the operation less difficult.

In the drawing is shown a top plan view of a portion of the frame of a locomotive provided with the improvement.

The present embodiment of the invention is shown in connection with the oscillating shaft 1 of a locomotive, the said shaft being journaled at its ends in the side members 2 of the frame of the locomotive. The oscillating shaft is provided with radial arms 3 at its ends for connection with the valve rods for operating the valves when the said shaft is oscillated, and with a third arm 4, near one end for connection with the reversing mechanism in the cab of the locomotive. At its center the shaft is provided with an arm 5, having its upper end forked and the arms 6 of the fork are arranged on opposite sides of the front end of a counterbalancing rod 7, and are pivoted thereto by means of a bolt or rivet 8. The counterbalancing rod 7 extends through an opening at the center of a cross brace plate 9, whose ends are secured to the side bars 2 of the frame as indicated at 10, and cushioning mechanism is arranged on each side of the brace plate. The said mechanism comprises coil springs 11 and 11$^a$, the spring 11 encircling the counterbalancing rod on one side of the plate 9, and the spring 11$^a$ encircling the said rod on the opposite side, and adjustable stops are connected with the rod at the outer ends of the springs. Nuts 12 and 12$^a$ are threaded on to the rod at the outer ends of the springs 11 and 11$^a$, respectively, and washers 13 and 13$^a$ encircle the rod adjacent to the nuts. Each spring bears at its outer end against a washer 13 or 13$^a$, and it will be obvious that by moving the nuts the tension of the springs may be adjusted.

In operation, when the reversing lever is swung in one direction to change the valve motion the spring 11 or 11$^a$ will be placed under compression. As the lever is swung in the opposite direction to again change the motion, that spring which is under compression will act on the counterbalancing rod 7 and on the oscillating shaft to assist in the swinging of the lever.

The greatest power of the spring will be at the beginning of the movement just when it is needed, and as the lever reaches the center both springs will be balanced under equal compression. As the lever is moved in the opposite direction past the center the other spring will be put under compression and will remain compressed with stored up power to assist in moving the lever when it is again swung in the first-named direction. Thus the lever and the valve motion is balanced regardless of the position of the lever, and the springs act with their greatest power at the exact time when such power is needed.

I claim:—

A counterbalancing device for use in connection with the reversing mechanism of a locomotive and comprising in combination with the frame of the locomotive having a cross brace plate and an oscillating shaft journaled transversely of the frame parallel with the plate and connected to the reversing mechanism, said oscillating shaft having intermediate its ends a radial arm, and a counterbalance rod pivoted at one end to the radial arm, the cross brace plate having an opening through which the rod extends, a coil spring encircling the rod on each side of the brace plate, and a stop on the rod at the outer end of each spring and adjustable longitudinally of the rod to vary the tension of the adjacent spring.

JOHN J. STRONG.

Witnesses:
O. E. SWARTS,
J. H. HEINEK.

Copies of this patent may be obtained for five cents each, by addressing the "Commissioner of Patents, Washington, D. C."